F. WINSLOW.
Apparatus for Heating Soles and Shoes.
No. 50,866.
Patented Nov. 7, 1865.
Fig. 1,
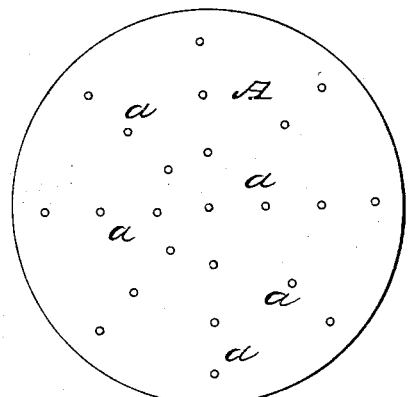
Fig. 2,
Section
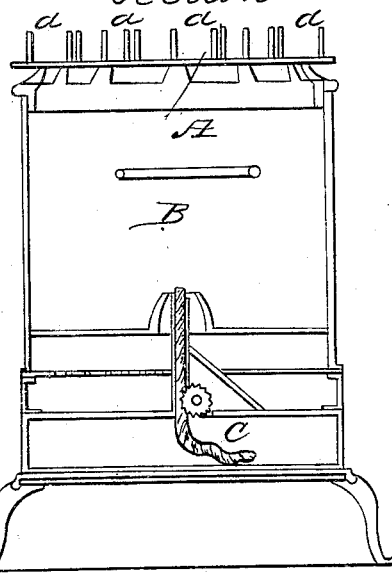
Witnesses:
J. P. Hale Jr
C. S. Swadkiss
Inventor:
Freeman Winslow
by his attorney
R. H. Eddy

UNITED STATES PATENT OFFICE.

FREEMAN WINSLOW, OF MARBLEHEAD, MASSACHUSETTS.

APPARATUS FOR HEATING SOLES AND SHOES.

Specification forming part of Letters Patent No. 50,866, dated November 7, 1865.

*To all whom it may concern:*

Be it known that I, FREEMAN WINSLOW, of Marblehead, in the county of Essex and State of Massachusetts, have invented a new and useful Apparatus for Heating Shoes and Soles, for softening the cement used for connecting and fixing the soles in place; and I do hereby declare the same to be fully described in the following specification and represented in the accompanying drawings, of which—

Figure 1 is a top view, and Fig. 2 a vertical section, of such apparatus.

It consists not only of a metallic plate or disk and a lamp or means of heating such disk, but a series of wires or short columns of small diameter, or the equivalent thereof, raised on or extending upward from the said plate or disk, the whole being substantially as exhibited in the said drawings, in which A is the metallic plate or disk, and $a\ a$, &c., the series of wires elevated thereon, each wire projecting perpendicularly from the upper surface of the disk. The said disk A is supported on the upper part of a case, B, which contains or has applied to it a powerful lamp, C, or other suitable means of applying heat to the lower surface of the plate A, for the purpose of heating such plate.

The above-mentioned apparatus is intended for heating a shoe and a sole which are to be connected together by cement capable of being liquefied by heat.

In the manufacture of shoes in which the outer is connected to the inner sole by cement it is customary to spread on the surfaces to be conjoined one or more layers of the cement, and to suffer the same to harden thereon. In this way soles are prepared in large numbers ready for use when wanted. Preparatory to being applied to a shoe each sole has to be heated, so as to liquefy or soften the cement to reduce it to a tacky or adhesive state. If laid directly on a heated plate, the sole or the shoe whose cement it may be desirable to soften would be likely to be burned or scorched. In order to prevent this, I combine with the plate the series of wires, on the upper ends of which I place or rest the sole or shoe. While the caloric ascending from the plate will suffice to heat and soften the cement, the wires will so keep the sole or shoe, as the case may be, elevated off the plate as to prevent such sole or shoe from being burned or scorched.

The apparatus made as described has been found to be of great service and advantage for the purpose for which it is intended.

What I claim as my invention is—

The combination of the series of wires $a\ a\ a$, &c., with the lamp or means of generating heat, and the plate A, or its equivalent, for supporting the said wires, the whole being arranged substantially as and for the purpose specified.

FREEMAN WINSLOW.

Witnesses:
R. H. EDDY,
F. P. HALE, Jr.